United States Patent Office 3,154,212
Patented Oct. 27, 1964

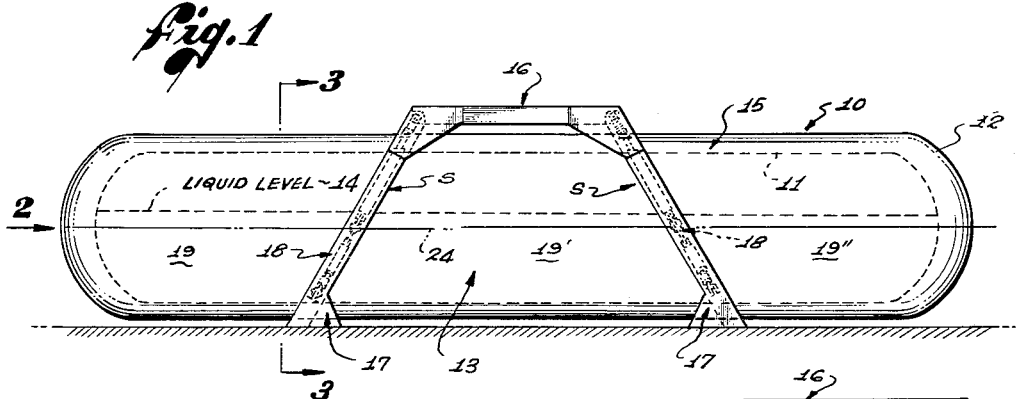
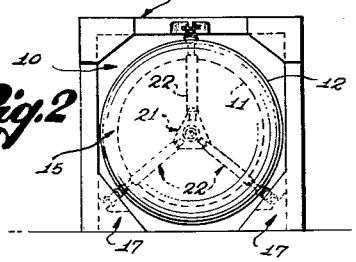
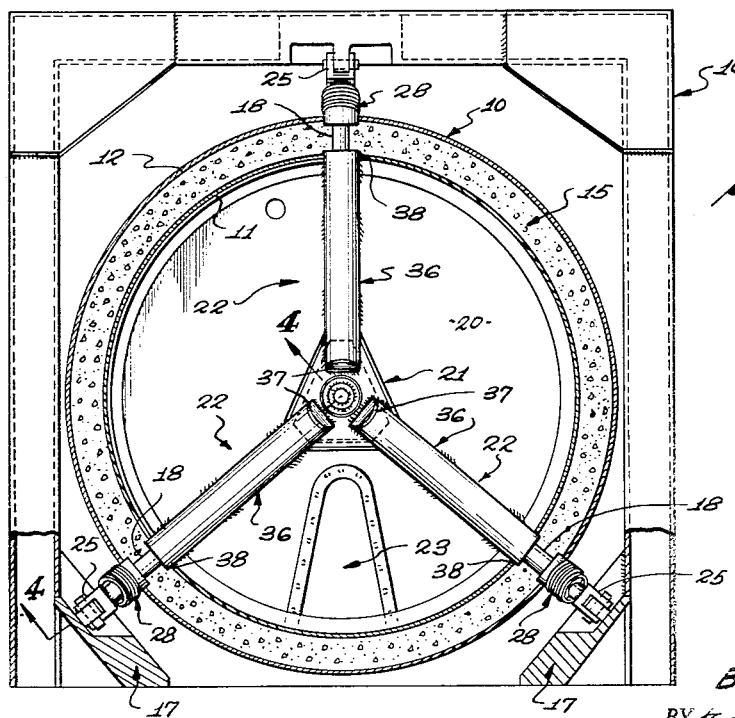

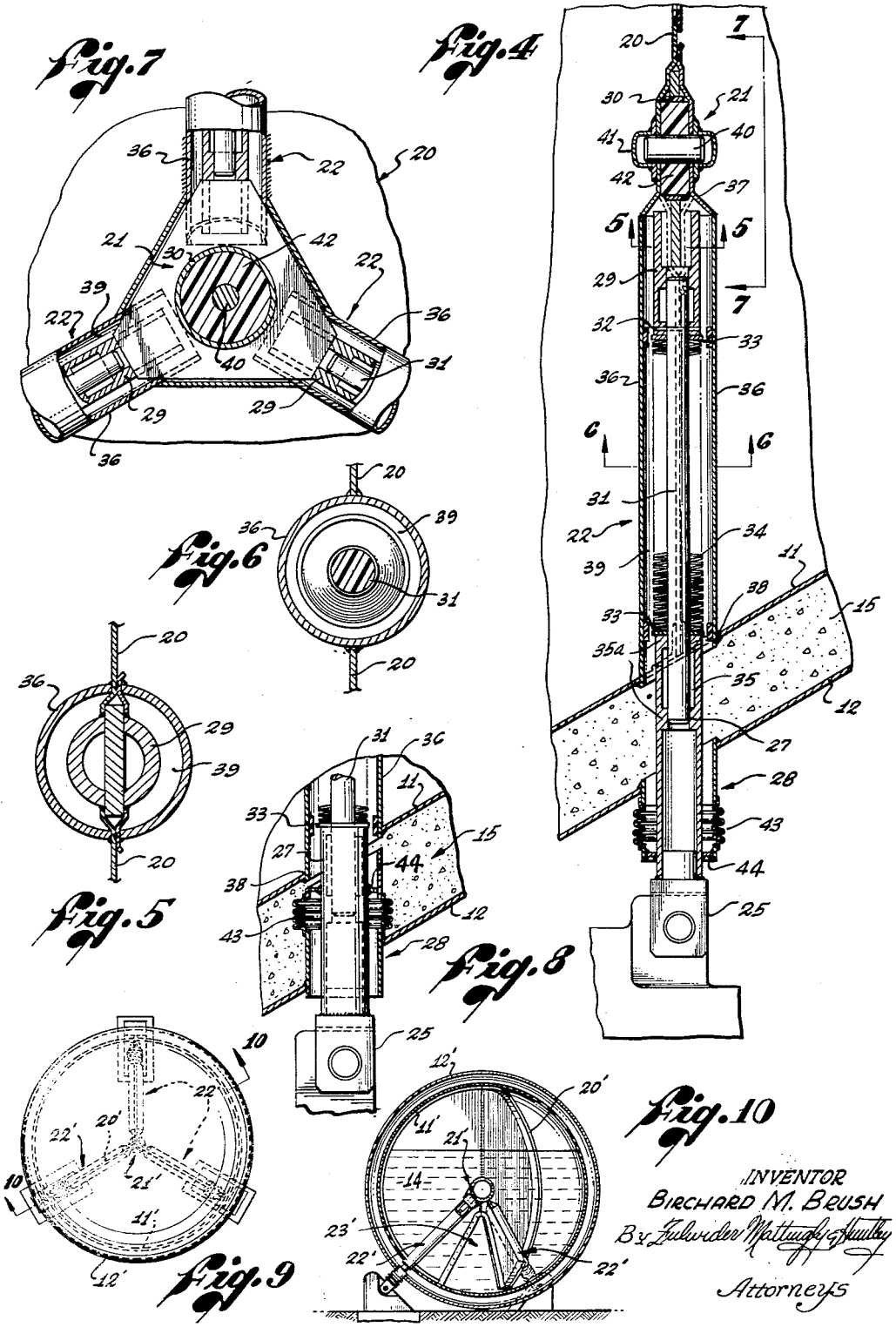

1

3,154,212
VESSEL MOUNTING SYSTEM
Birchard M. Brush, Denver, Colo., assignor to Cryo-
Sonics, Inc., Los Angeles, Calif., a corporation of
California
Filed May 8, 1961, Ser. No. 108,650
7 Claims. (Cl. 220—15)

This invention relates generally to the design of tanks or other similar vessels. More specifically, this invention relates to improved systems for supporting vessels having walls composed of multiple and separated layers.

Vessels having walls composed of multiple layers are in widespread use in industry for many different purposes. One of the most common applications for such vessels is to store very hot or very cold liquids, wherein the space between the walls of the vessel is either evacuated or filled with insulating material or both. Such a vessel having an evacuated inter-wall space is often called a Dewar flask.

Double wall insulating vessels of this type are commonly constructed in an elongated cylindrical shape and are mounted with the cylindrical axis generally horizontal. The concentricity of the inner and outer walls is maintained by arcuate spacers which span the inter-wall envelope at selected places. Because these spacers represent a heat leak path across the envelope, they are generally made as small as possible and often have a limited arcuate extent extending only along the underside of the inner shell.

Many fields of modern technology require storage of large quantities of low temperature liquid oxygen (LOX) fuel. Among such uses is the storage of liquid fuel gases for rockets and missiles.

Because the launching of large missiles causes severe ground shocks in the area near the launching platform, considerable difficulty has been experienced in suitably mounting insulated liquid storage vessels to protect them from structural breakdown. On a number of occasions, these tanks have ruptured causing severe explosions which resulted in the loss of valuable fuel and equipment. Accordingly, there has been a great need to provide cryogenic storage facilities which are capable of withstanding severe ground shocks and at the same time capable of storing cryogenic fuels for long periods of time without severe evaporation losses or the development of excessive pressures.

The design problem thus presented cannot be easily solved merely by making the vessel of a heavier and stronger material. For if weak parts of the structure, such as the spacer elements referred to above, are made of stouter and heavier material, such strengthening will substantially impair the thermal insulating properties of the vessel. Furthermore it becomes economically impractical to construct vessels of standard design and sufficient strength to withstand severe shock loads.

As has also been noted earlier, in order to minimize heat leakage, the spacer plates are often constructed of thin material having a limited arcuate extent extending under merely the underside of the inner shell. This design is vulnerable in that full advantage is not taken of the increased strength which would obtain if the entire circumference of the shells was used to absorb the stress of ground shock. Furthermore, spacer plates of this design must withstand a buckling force and hence are more likely to rupture than if the ground shock was absorbed in tension.

Accordingly, it is a major object of my invention to provide an improved design for vessels and their supports which will obviate some of the difficulties experienced in prior structures of this type.

It is another object of my invention to provide an improved design for cryogenic vessels and vessel mountings which will improve their thermal insulation properties.

It is a further object of my invention to provide an improved design for vessels and mountings of the class described which will better enable them to withstand ground shock without damage.

Still another object of my invention is to provide an improved design for double walled vessels and supporting structure therefor which will enable them to withstand relatively severe ground shock without at the same time compromising their thermal insulation properties.

These and other objects and advantages of my invention will become apparent from the accompanying description and drawings of illustrative embodiments thereof, wherein:

FIGURE 1 is an elevation of a cylindrical double walled storage tank incorporating my improved support system;

FIGURE 2 is a view of FIGURE 1 taken from the direction of arrow 2;

FIGURE 3 is an enlarged transverse section taken along line 3—3 in FIGURE 1;

FIGURE 4 is an enlarged sectional view of my improved strut assembly taken along line 4—4 in FIGURE 3;

FIGURE 5 is an enlarged sectional view taken along line 5—5 in FIGURE 4;

FIGURE 6 is an enlarged section taken along line 6—6 in FIGURE 4;

FIGURE 7 is a partial view of FIGURE 4 taken along line 7—7 thereof shown partly in section to illustrate the hanger axis design;

FIGURE 8 is a partial view of FIGURE 4 showing an alternative structure for sealing and supporting the outer shell;

FIGURE 9 is a plan view of a spherical double shell tank employing the improved support principles of my invention; and FIGURE 10 is a section taken along line 10—10 in FIGURE 9.

FIGURES 1 through 3 show a cylindrical storage tank 10 of the type commonly used for storing liquid oxygen or other similar cryogenic material. As shown, the walls of the tank comprise an inner shell 11 and a surrounding and generally concentric outer shell 12. The volume within the inner shell comprises the storage space 13 for the cryogenic material 14, while the envelope space 15 between the two shells is placed under vacuum and filled with an insulating material 27 such as Perlite having a low thermal conductivity. This insulating envelope 15, therefore, completely surrounds the cryogenic fluid 14 and greatly reduces the amount of heat transferred from the outside atmosphere to the much colder cryogenic fluid.

The vessel is embraced by a generally trapezoidal steel framework 16 which is rigidly anchored to a series of concrete foundation piers 17. In order to suspend the tank on this framework, I provide two support assemblies S constructed as an integral part of the tank.

The support assemblies S are generally planar and divide the inner portion of the tank into three compartments 19, 19' and 19''. As can be best seen in FIGURE 3, each support assembly consists of a hanger plate 20 (which acts somewhat as a tank baffle or divider), a hanger axis member 21, and three generally radial strut assemblies 22 which diverge from the hanger axis member 21. All of these elements will be described below in more detail.

Each hanger plate 20 is welded securely to the inner circumference of the inner shell 11 and is provided with a slosh port 23 to permit limited movement of the liquid between compartments. Compartments having ports of this type are often used in storage vessels to damp the severe sloshing forces induced in the heavy liquid mass by ground vibration. Heretofore, slosh damping plates of this type have further compromised the strength of the vessel by placing an additional load on the inter-shell spacer elements. However, as will appear below, my improved design makes heavy slosh damping compartments an asset, rather than a detriment to the structural integrity of such vessels.

The hanger axis or support members 21 are located in the plane of the plates 20 and on the central longitudinal axis 24 of the tank. As will be seen, the members 21 have as their main function the job of linking the hanger plate 20 with the strut assemblies 22.

The strut assemblies 22 act in compression between the hanger axis member 21 and the external foundation framework 16 to which they are attached by clevis members 25.

By means of structure, which will be described in more detail below, the points of intersection between the inner shell 11 and the strut assemblies 22 are sealed by sylphon bellows members or seals 28 in a manner that makes them substantially non-load bearing. Therefore, the inner shell 11 is in effect "hung" from the hanger plate 20, which in turn is "hung" from the hanger axis member 21, which in turn is supported on the strut assemblies 22. Accordingly, maximum advantage is taken of the inherent strength of the inner shell, since any support stress or gound shock forces are distributed over substantially its entire circumference, rather than being concentrated in a limited lower arcuate portion thereof.

Furthermore, since these plates absorb ground shock in tension, rather than in compression as in conventional spacer elements, they are stressed in a mode wherein a plate of a given thickness has its maximum strength.

Finally, since the hanger members 20 do not span the inter-shell envelope 15, and hence do not form a heat leak path, they can be made as thick and sturdy as desired without compromising the thermal insulation properties of the vessel.

The weight of the outer shell is borne by the insulation material which is packed into the intershell envelope 15. Additionally, the concentricity of the shells may be partially maintained by very light spacer elements (not shown). However, because such spacer elements bear a relatively small portion of the weight of the outer shell 12, and bear none of the weight of the heavy cryogenic liquid, they can be made of a relatively weak material such as Fiberglas or Micarta having a low thermal conductivity.

Since the seals 28 do not have to support the heavy weight of the inner shell, the hanger plates, and the liquid stored therein, the relatively small stresses imposed by the seals on the tank can be concentrated in the area immediately adjacent the seals without serious risk of vessel rupture. Furthermore, any rupture at this point will at worst result in a loss of vacuum rather than the escape of cryogenic fluid. Loss of vacuum can be quickly detected and corrected, while, on the other hand, the escape of the stored fluid might cause a disasterous explosion before it was detected.

As shown in FIGURE 3, each strut assembly 22 comprises a central load bearing and shock absorbing strut 18 surrounded by a cylindrical housing or sheath 36. The sheath 36 does not touch the struct 18 and hence provides an annular gap or space around each of the struts 18 which insulates it from the cryogenic contents of the storage space 13.

As seen in detail in FIGURES 4 through 8, each central load bearing strut 18 has an outer terminal sleeve 27 rigidly connected by a clevis 25 to the foundation frame 16, 17, and an inner terminal sleeve 29 bearing against the hanger axis 21 at an abutment ring 30. These two sleeve members 28, 29 are connected by a guide rod 31, one end of which is fastened by a pin 32 to the inner sleeve 29, the other end of which is free to slide back and forth within the outer sleeve 28, thereby permitting the strut 18 to telescope, when subjected to axial forces. The confronting faces of the two sleeve members are provided with spring abutment flanges 33 adapted to work against a column of spring leaves 34 (comprising a portion of the strut 18) surrounding and held in place by the guide rod 31. The column of leaves comprises a plurality of alternately, oppositely disposed concave disks. Preferably, the leaves are of a character that the desired resilience is afforded with a minimum of spring material. However, it will be understood that other types of springs may be used.

To restrict the flow of heat from the external foundation framework to the interior of the tank, the guide rod 31 may be constructed of a plastic having low thermal conductivity such as Micarta. Furthermore, the axial channels in the strut sleeve members which receive this guide rod 31 can be provided with annular channels 35 so that the guide rod touches the sleeve only at the two separated ridges 35a formed by this internal annular channel 35, thereby further reducing any heat leak paths.

It will thus be seen that compressional forces acting along the longitudinal axis of the strut 18 will tend to telescope the guide rod 31 and sleeve members 28 and 29 against the column of spring leaves 34. In particular, this strut design will enable the spring column to absorb a substantial portion of any ground shocks to which the foundation frame 16, 17 may be subjected, and hence will insulate the hanger axis 21, hanger plates 20, and inner shell 11 from a substantial portion of any ground vibration forces.

The telescoping action of the two sleeve members 28, 29 against the spring column 34 permits the strut 18 to resist only axial stresses which tend to compress the spring column. Accordingly, it is desirable to arrange the struts in the manner shown in FIGURES 1 through 3. As is there shown, the three strut assemblies 22 in each support assembly diverge from the hanger axis 21 at angles of 120° from each other, thereby spacing them equally around the circumference of the tank. In addition, as is seen in FIGURE 1, the planes of the hanger plates 20 are inclined toward one another, each plane making an angle of approximately 60° with the horizontal ground line. It will, therefore, be apparent that this support configuration causes all ground shocks, whether in the horizontal or vertical direction, to subject at least two of the struts 18 to axial compression forces. Accordingly, the spring columns 34 of at least two struts will be operative to absorb such shocks before they are transmitted to the inner shell 11 of the tank.

Returning now to FIGURES 4 and 6, it will be seen that the cryogenic contents 14 of the inner tank are sealed from the central load bearing portion of the struts 18 and from the inter-shell insulating envelope 15 by a cylindrical sheath 36 welded to form an integral part of the hanger plate 20. These sheaths are closed at their inner ends 37 around a portion of the hanger axis assembly and open at their outer ends 38 to permit access to the inter-shell insulating envelope 15. The sheath 36 has a sufficiently large internal diameter to surround the sleeve 28, 29 and spring column 34 portions of the strut 18 with an annular space 39. Because the sheath 36 is vented directly into the inner-shell vacuum, this annular space 39 will also be under vacuum and hence will provide an insulating envelope resisting any transfer of heat from the strut 18 to the cryogenic liquid 14.

It should be noted that if the support forces and ground shock forces are to be transmitted through the strut assemblies 22, hanger axis 21, and hanger plate 20 to a substantial portion of the inner shell circumference 11, then the strut passage portion of the inner and outer shells must be sealed in a manner that a minimum of strut forces are transmitted to these strut passage portions by the seal. Welding the strut surrounding sheaths 36 to the hanger plate 20 prevents any relative movement between two members. Hence, any forces experienced by the sheath 36 are also experienced in equal degree by the entire hanger plate assembly 20, thereby insuring that these forces will be absorbed equally around these portions of the inner shell 11 which are welded to the hanger 20.

Although the support system described herein is particularly well adapted to maintain the thermal insulation properties of double shell vessels, it will be apparent that it also has utility, when applied to single wall tanks because it distributes shock over a large portion of the vessel wall. In the latter application, the sheath arrangement 36 which insulates the strut 22 as well as sealing the inner shell 11 may become unnecessarily elaborate. In such circumstances, the strut passage portion of the wall may be sealed by a variety of devices, for instance by a device like the tubular bellows seals 28 used to seal the outer shell 12 in the embodiment disclosed herein. The criteria for such seals should include provision for suitable flexibility of movement between the strut assembly 22 and the strut passage portion 26 of the wall so that any additional loads concentrated at the strut passage portion are not significant, i.e., under ground shock or normal support loads they will not exceed the rupture strength of the strut passage portion of the wall wherein they are concentrated.

Returning now to the instant embodiment and in particular to FIGURES 4 and 8 thereof, it will be seen that the hanger axis comprises a central pin 40 surrounded by a metal covering 41 to which the hanger plate 20 is welded. Inside the covering 41 and surrounding the axis pin is an insulating ring 42 against which the inner sleeve member 29 of the strut 22 is mounted. The strut sheath 36 is sealed closed at its inner end 37 at a point between the outer circumference of this insulating ring 42 and the axis pin 40.

With the exception of the junction between this insulating ring 42 and the inner strut sleeve member 29, all paths of heat leakage between the inner tank and the outer atmosphere comprise either a vacuum or an evacuated bed of granular insulating material. Accordingly, this junction, like the envelope spacer plates in conventional vessels, represents the "weakest" point in the insulation system. In order to minimize heat leakage at this point, the insulating ring 42 is made of a reinforced plastic, such as Micarta, having high structural strength and relatively low thermal conductivity.

It should be noted that the insulation properties of the vessel are greatly improved by changing the ring of maximum heat leakage from a relatively large spacer ring spanning the inter-shell space to a relatively small ring adjacent the hanger axis. The heat transfer area "seen" by the heat flow is directly proportional to the mean circumference of the ring and hence its mean radius. Accordingly, reducing the radius of the ring as in the present invention, greatly reduces the heat leak area.

As has been noted above, the outer shell of the tank is held in the desired relation to the strut 22 and hence to the inner shell 11 by shell sealing members 28. FIGURES 4 and 8 illustrate alternative mounting arrangements for the outer shell sealing members. In both arrangements, this outer seal comprises a tubular member surrounding the outer strut sleeve 28 and attached thereto by a radial plate 44 which serves to seal the inter-shell insulating envelope 15 from the outside of the tank. A portion of the cylindrical walls of this sealing member comprises a flexible cylindrical bellows type spring 43 which compensates for shrinkage and vibrations between the outer strut sleeve 28 and the outer shell 12. Furthermore, the method of supporting the outer shell does not impair the insulating properties of the inter-shell envelope, since it does not bridge it with a structural member.

This support arrangement for the outer shell 12 operates independently of the weight of and position of the inner shell 11. Accordingly, the sealing member 28 can be fairly light and can operate only on the strut passage portion of the outer shell 12. Alternatively, conventional spacer plates spacing the insulation envelope 15 can be used to support the outer shell. However, such plates can be relatively light and few, because they are not called upon to support the weight of the inner shell and its contents.

FIGURES 9 and 10 illustrate an alternative arrangement of struts 22' and hanger plates 20' which permit my improved support system to be applied to spherical double wall shell insulating vessels. In this embodiment, the three strut assemblies 22' form a tripod configuration in which the strut assemblies 22' are equally spaced from one another. The hanger plate assembly in this instance comprises three plates, each of which lies in the plane of one of the strut assemblies 22'.

Although I have described the presently preferred embodiments of this invention, it will be apparent that various modifications can be made to the structure which fall within the spirit and scope of this invention. For instance, the hanger plates 20 can be replaced by a series of metal hanger struts or the shock absorbing springs 34 shown in the described strut can be replaced by coil springs, hydraulic cylinders, or any energy storing media which is consonant with the anticipated loads. Accordingly, I do not intend to be limited except by the scope of the following claims.

I claim:

1. An elongated cylindrical tank having its axis mounted parallel to the ground having two generally planar support assemblies, each assembly being inclined upwardly toward the other, each assembly comprising: a hanger support located within said tank and in the plane of said assembly; a hanger plate in said plane suspending in tension the wall of said tank from said hanger support, said plate having a substantial portion of its periphery attached to said wall; three struts extending outwardly from said hanger support in said plane at substantially equal angles from each other, said struts projecting through openings in said wall to the outside of said tank, the outer ends of said struts being adapted for connection to a foundation thereby positioning said hanger support in a desired relation to said foundation; shock absorber means associated with said struts to reduce the transmission of shock from said foundation to said wall; and sealing means associated with each of said openings to prevent the escape of material stored in said tank, said sealing means permitting relative movement between said walls and said struts.

2. In a tank having walls comprising concentric inner and outer shells, said inner shell affording a storage space and said shells together defining an envelope around the storage space, a support assembly comprising: a hanger support located within said storage space; a flat hanger plate structure connected at its edge to said inner shell and to said hanger support to suspend said inner shell and its contents in tension from said hanger support; strut means extending from said hanger support through openings in said inner and outer shells, said strut means having a first portion inside said tank connected to said hanger support and a second portion outside said tank adapted for connection to a foundation to mount said hanger support upon said foundation; shock absorption means cooperating with portions of said strut means for insulating said inner shell from ground vibrations; sealing means adjacent said openings in said inner shell to seal said storage space from said envelope, said sealing means permitting relative movement between said walls and said strut means; strut insulation means between the first and second portions of said strut means to retard the flow of heat between said strut means and material within said storage space; and means in said envelope to support said outer shell and to maintain the concentricity of said shells.

3. In a tank having walls comprising concentric inner and outer shells, said inner shell affording a storage space and said shells together defining a first envelope around the storage space within said inner shell, a support assembly comprising: a hanger support located within said storage space, having a strut abutment portion on the periphery thereof composed of thermal insulation material; tensile hanger means connecting in tension said inner shell with said hanger support to suspend said inner shell and its contents from said hanger support; telescoping strut means abutting said strut abutment portion and extending outwardly from said hanger support through openings in said inner and outer shells, said strut means having portions outside said tank adapted for connection to a foundation to mount said hanger support upon said foundation; and a housing defining a second envelope around said strut means and being spaced therefrom, one end of said housing being closed upon said hanger support inside the periphery thereof, the other end of said housing surrounding said opening in sealing engagement with said inner shell whereby to vent said second envelope into said first envelope.

4. A storage tank comprising: a spherical storage vessel having a central vertical axis; a hanger support located on said axis within said vessel; an integral hanger plate structure including a plurality of substantially equi-angularly spaced plate sections secured to said hanger support and extending radially outwardly from said axis, each of said sections having an arcuate edge engaging and secured to the inner periphery of said vessel along a curved line extending substantially from the top to the bottom thereof; a plurality of struts connected to said hanger support and associated, one each, with said plate sections, each of said struts being arranged parallel to its respective plate section and extending outwardly from said support through openings in the wall of said vessel and being adapted for connection to a foundation; shock absorber means associated with said struts for reducing the transmission of shock from said foundation to said hanger support; and sealing means adjacent said openings for preventing the escape of material from said vessel, said sealing means permitting relative movement between said vessel and said struts.

5. In a tank having concentric inner and outer shells, said inner shell affording a storage space and said shells together defining an envelope around the storage space, a support assembly comprising: a hanger support located centrally within said storage space; a hanger plate disposed within said inner shell and connecting the inner shell with said hanger support, said plate having a substantial portion of its periphery attached to said inner shell; inner and outer sleeve members having axial bores, said members being axially spaced with said inner member being connected to said support and said outer member being adapted for connection to a foundation; a guide rod extending through aligned openings in said shells and having its opposite ends disposed in said bores and arranged for reciprocation in at least one of them, said rod having a thermal conductivity relatively low as compared to metal; an elastically compressible column coaxially mounted on said rod and abutting said sleeves at its opposite ends, said column being adapted to absorb axial forces tending to move said sleeve members toward one another; a housing spaced from said sleeve members, rod, and column, and enclosing same and the inner side of the opening in said inner shell to prevent fluid in said storage space from contacting said sleeve members, rod, and column and from escaping from said storage space; sealing means on said outer shell and said outer member for sealing the opening in said outer shell to prevent passage of material between said envelope and exterior of said tank, said sealing means being adapted to permit relative movement between said outer sleeve member and said outer shell; and means in said envelope to maintain the concentricity of said shells.

6. A storage tank comprising: a spherically shaped inner vessel affording a storage space; a spherically shaped outer vessel positioned concentrically with said inner vessel and together therewith defining an insulation envelope around said storage space; a hanger support located centrally within said inner vessel; a hanger plate structure including a plurality of substantially vertically arranged and equi-angularly spaced plate sections secured to said hanger support and extending radially outwardly therefrom, each of said sections having an arcuate edge engaging and secured to the inner periphery of said inner vessel along a curved line that extends substantially from top to bottom of said inner vessel; a plurality of struts connected to said hanger support and associated, one each, with said plate sections, each of said struts being arranged parallel to its respective plate section and extending outwardly from said support through openings in said vessel and being adapted for connection to a foundation; shock absorber means associated with said struts for reducing the transmission of shock from said foundation to said hanger support; first sealing means on said inner vessel adjacent the openings therein for preventing the escape of material from said storage space; and second sealing means on said outer vessel adjacent the openings therein for sealing said envelope to the exterior of said tank, said second sealing means permitting relative movement between said vessels and said struts.

7. The subject matter of claim 6 including means in said envelope for supporting said outer vessel and maintaining the concentricity of said vessels.

References Cited in the file of this patent

UNITED STATES PATENTS

| | | |
|---|---|---|
| 2,113,803 | George | Apr. 12, 1938 |
| 2,229,793 | Bradley | Jan. 28, 1941 |
| 2,256,679 | Kornemann et al. | Sept. 23, 1941 |
| 2,358,190 | Theriault | Sept. 12, 1944 |
| 2,528,780 | Preston | Nov. 7, 1950 |
| 2,727,621 | Fillion | Dec. 20, 1955 |
| 2,817,435 | Butterfield | Dec. 24, 1957 |